(12) United States Patent
Lu et al.

(10) Patent No.: US 7,415,525 B2
(45) Date of Patent: Aug. 19, 2008

(54) USB APPLICATION ADOPTING BLUETOOTH PROFILE WITH A SHARING IMPLEMENTATION

(75) Inventors: Fan Lu, Port Coquitiam (CA); Wenkai Du, Richmond (CA)

(73) Assignee: Nokia Corporation, Espoo (FI)

( * ) Notice: Subject to any disclaimer, the term of this patent is extended or adjusted under 35 U.S.C. 154(b) by 979 days.

(21) Appl. No.: 10/674,843

(22) Filed: Sep. 29, 2003

(65) Prior Publication Data

US 2005/0071487 A1 Mar. 31, 2005

(51) Int. Cl.
*G06F 15/16* (2006.01)
(52) U.S. Cl. .................. 709/230; 709/202; 709/227
(58) Field of Classification Search ........... 709/230, 709/202, 227, 228, 331
See application file for complete search history.

(56) References Cited

U.S. PATENT DOCUMENTS 7,035,932 B1 * 4/2006 Dowling .................. 709/230

OTHER PUBLICATIONS

Rathi, Sailesh "Blue Tooth Protocol Architecture", published in Dedicated Systems Magazine, 2000, pp. 28-33.*

* cited by examiner

*Primary Examiner*—David Lazaro
(74) *Attorney, Agent, or Firm*—Harrington & Smith, PC

(57) ABSTRACT

A Short Range Connectivity Server (SRCS) is provided to manage transport connections. The SRCS is a standalone server that runs multiple service controllers using OBEX over Bluetooth and USB. The SRCS manages all transports enabling a transport plug in strategy to be adopted. This architecture provides a generic management mechanism to create and manage the transport layer connections. Modular design components enable Bluetooth and USB application development to be undertaken without requiring knowledge of the details of the individual transport protocols. This results in a completely transparent mechanism for application development regardless of transport. The SRCS is in charge of the higher layer services controllers. Additionally, a Service Controller framework is provided for Object Exchange Protocol (OBEX) related services.

33 Claims, 16 Drawing Sheets

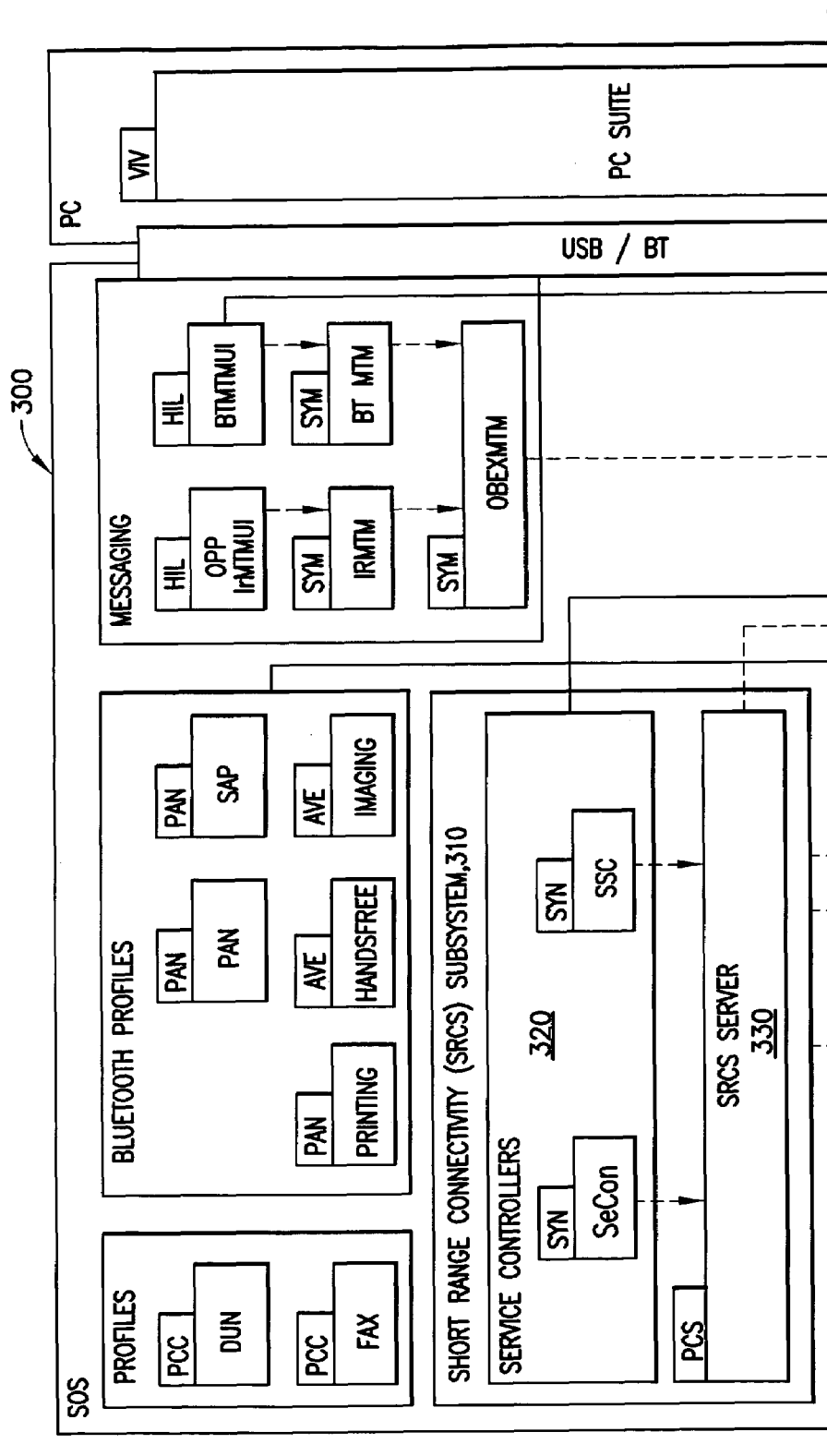

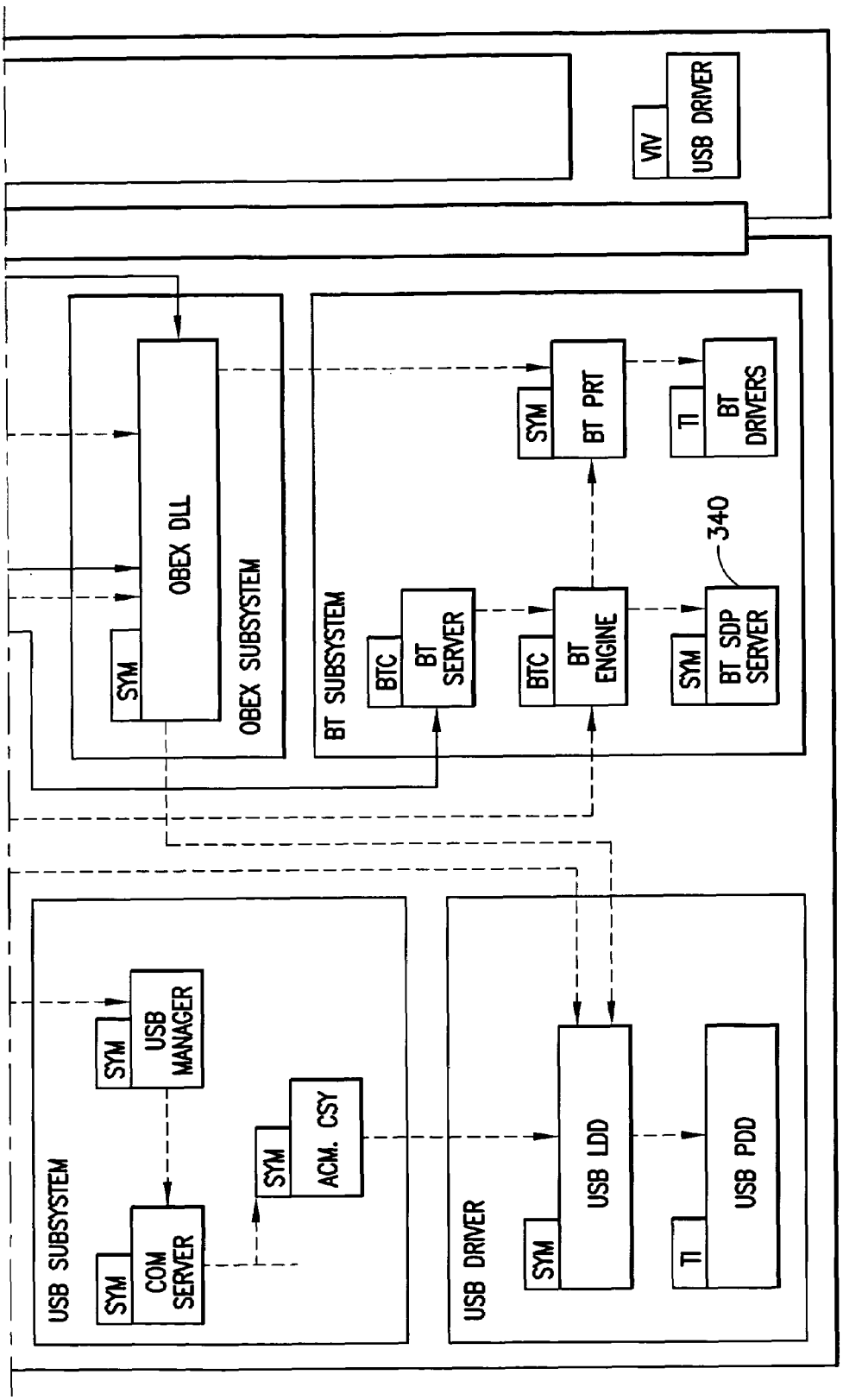

USB APPLICATION ADOPTING BLUETOOTH PROFILE WITH A SHARING IMPLEMENTATION

TECHNICAL FIELD

This invention relates generally to wireless communications systems and networks and, more specifically, relates to USB applications adopting Bluetooth™ profiles over different transport mediums with a sharing implementation.

BACKGROUND

With the increasing use of the Internet, cellular telephones, and other mobile communications devices, the need for interconnectivity and interoperability of these devices has also increased. As a result of this growth, problems have arisen related to limited bandwidth as well as interconnectivity issues between "wired" and "unwired" devices. Solutions to these problems have included the development of the Universal Serial Bus standard, developed by the USB Promoter group in 1995, and the Bluetooth™ protocol (Bluetooth is a Trademark owned by Bluetooth SIG, Inc.).

The Universal Serial Bus (USB) specification is a standardized peripheral connection developed by computer and telecommunication industry members for attaching peripherals to computers. USB makes plugging in peripheral devices easier with plug and play. It is nearly 100 times faster than the original serial port it was designed to replace, and it supports multiple device connectivity.

USB allows expandability of a PC's capabilities via an external port. Since USB supports multiple peripheral devices simultaneously, it allows users to run numerous devices such as printers, scanners, digital cameras and speakers from a single PC. USB also allows for automatic device detection and installation. USB's quick proliferation as the replacement for the serial port and other PC ports for I/O devices such as digital joysticks, phones, scanners and digital cameras has accelerated the production and availability of such devices. In addition, virtually every new PC today has one or more USB ports, quickly moving the installed base of USB-capable PCs to the range of hundreds of millions.

Data is exchanged between the host PC and the peripheral through a USB hub using data transfer types such as control, bulk, interrupt, and isochronous. Data transfers can be either unidirectional or bi-directional. Control transfers are used to configure a peripheral device to the host when the device is first attached to the USB network. Bulk transfers are used to move large amounts of data to peripherals, such as printers and scanners. Interrupt data transfers are used when a peripheral device specifies and controls the rate at which the data is moved over the network. Isochronous transfers are used to move data such as voice, audio, and video at real-time speeds.

The Bluetooth™ (BT) protocol has resulted from the National Telecommunications Act opening new public access to the ultra high frequency (UHF) and very high frequency (VHF) bands. As a direct consequence, wireless local area networking is rapidly evolving as the communications standard for small and mobile corporations and other organizations. An important aspect of these new wireless networks is the integration of household (and business office) appliances, laptop computers, and personal communications service (PCS) devices. This technology, called BT, seamlessly connects each intelligent appliance in a household or an office within a "piconet" (implying a very small) wireless network.

BT is an embedded, low-power, short-range, radio-frequency (RF) technology, although it can also be IR media-based with moderate bandwidth. BT is particularly attractive for exchanging data between personal devices such as cellular phones, radios, pagers, personal digital assistants, computers, video and still cameras, audio players, and local area networks (LANs).

With an operating range of 10 meters or less, the reach of BT exceeds the current range of IR, but falls far short of other types of wireless networks. BT is implemented at 2.4 GHz in the Industrial, Scientific, and Medical (ISM) band.

The BT architecture integrates a combination of hardware and software into the networking device. The hardware is an embeddable module, or a module residing on a card, which interfaces with the host device. It interfaces on one side with the host and on the other side with another BT device via its RF or IR transceiver. On the host side, there are four currently identified interfaces: the universal serial bus (USB), the PC card (or PCMCIA), and two serial interfaces, UART and RS232. All of these have established standards that define the physical logical interaction. However, the higher level interaction between the BT device and the host is defined in unique BT protocols and profiles.

A BT profile describes how the technology is used (i.e. how different parts of the specification can be used to fulfill a desired function for a BT device). A profile can be described as a vertical slice through the protocol stack. It defines options in each protocol that are mandatory for the profile. It also defines parameter ranges for each protocol. The profile concept is used to decrease the risk of interoperability problems between different manufacturers' products. These profiles do not normally define any additions to the BT specification, which is why new profiles can be added where desired. The underlying BT technology is the same, only the specific way that it is used is defined and clarified.

There are 13 "profiles" described in version 1.1 of the BT specification. These profiles are general behaviors through which BT units communicate with other units. The 13 original profiles constitute the basis for the user models and their profiles. The profiles also provide the foundation for future user models and profiles.

Referring to FIG. 1, the profiles include the Generic Access Profile (GAP) 110, which defines how two Bluetooth units discover and establish a connection with each other. GAP ensures that any two Bluetooth units, regardless of manufacture and application, can exchange information via BT in order to discover what type of applications the units support. The Service Discovery Application Profile (SDAP) 115 defines the investigation of services available to a BT unit. This application interfaces the Service Discovery Protocol (SDP) that sends and receives service inquiries to and from other Bluetooth units. The SDAP 115 is dependent on the GAP 110, i.e. SDAP re-uses parts of the GAP.

The Cordless Telephony Profile 120 defines how BT can be used as a wireless phone. It describes how a BT adapted cellular phone should switch to BT wireless phone-function when it comes within reach of a BT base station. The Intercom Profile 125 connects with the cordless telephony profile 120. It defines how two BT equipped cellular phones in the same network should be able to communicate directly with each other, without using the public telephone network.

The Serial Port Profile 130 defines how to set-up virtual serial ports on two devices and connect these with BT. The Headset Profile 135 defines how a BT-headset should communicate with headsets or computers. The Dial-up Networking (DUN) Profile 140 defines how a modem-connection over the public telephone network can be linked to a BT equipped terminal, such as a laptop, BT equipped modem or BT equipped cellular phone. The Fax Profile 145 is similar to the Dial-up Networking Profile 140, except that it interfaces a fax. The LAN Access Profile 150 defines interconnections between BT equipped terminals and LANs (and on to Internet).

The Generic Object Exchange Profile (GOEP) 155 defines the set of protocols and procedures to be used by applications handling object exchanges. Several usage models are based on this profile, e.g. File Transfer and Synchronization. The Object Exchange Protocol (OBEX)-standard is used.

The Object Push Profile 160 is used in conjunction with the Generic Object Exchange Profile 155 to send and receive small objects. The File Transfer Profile 165 is used in conjunction with the Generic Object Exchange Profile 155 to transfer files between two BT units. The Synchronization Profile 170 is used in conjunction with the Generic Object Exchange Profile 155 to enable synchronization of calendar and address information between computers.

The Symbian operating system (OS) is an open, standard operating system licensed by mobile phone manufacturers. It is designed for the specific requirements of data-enabled 2 G, 2.5 G and 3 G mobile phones. Symbian OS includes a multi-tasking kernel, integrated telephony support, communications protocols, data management, advanced graphics support, a low-level graphical user interface framework and a variety of application engines.

Symbian OS is specifically designed for portable, battery-powered mobile phones. Some of the features that make Symbian OS ideal for developing communications software include a flexible client-server based architecture and programming system to support compact but powerful software on wireless information devices, instant access to user data using an effective multi-tasking kernel at the lowest-level, and a very easy user interface framework at the highest level and adaptability to different device types and different underlying communication technology.

Symbian OS provides a core of application programming interfaces (APIs) that are common to all Symbian OS phones. Components of Symbian OS include a suite of application engines, OBEX for exchanging objects such as appointments and business cards; integrated APIs for data management, text, clipboard and graphics; communication protocols including wide-area networking stacks including TCP/IP and WAP, personal area networking (PAN) support including infrared (IrDA), Bluetooth and USB; data synchronization including over-the-air (OTA) synchronization support using Synchronization Mark-up Language (SyncML); PC-based synchronization over serial, Bluetooth, Infrared and USB; a PC Connectivity framework providing the ability to transfer files and synchronize personal information management (PIM) data.

The BT profiles were the initial drivers for Symbian OS BT implementation. In the Symbian OS BT architecture, core stack functionality is implemented by two components, a Host Controller Interface (HCI.DLL) and the Bluetooth protocol module (BT.PRT). The BT protocol module encapsulates the BT Logical Link Control and Adaptation Layer Protocol (L2CAP) and RFComm layers. The RFCOMM protocol provides emulation of serial ports over the L2CAP protocol. As a Symbian OS protocol module, it provides a sockets API to these protocols. BT.PRT furthermore spawns distinct BT Manager and Service Discovery Protocol (SDP) server threads. The SDP server handles SDP queries and responses. Serial port emulation is supported by the BT comm server module (BTCOMM.CSY) which provides a number of virtual serial ports for different legacy services running over RFCOMM socket functionality.

Within the foregoing innovations, it can be noted that each transport medium has its own application implementation. Thus, the system is not well optimized. The USB acts as a serial bus and does not define any application profiles.

SUMMARY OF THE PREFERRED EMBODIMENTS

The foregoing and other problems are overcome, and other advantages are realized, in accordance with the presently preferred embodiments of these teachings.

In one aspect, this invention reuses the BT profile components for other transports such as USB, by expanding the USB capability and code efficiency in the mobile terminal software architecture design with a central short range connectivity management mechanism.

An embodiment of the present invention provides a Short Range Connectivity Server to manage all transports enabling a transport plug-in strategy to be adopted. This embodiment relates to the overall architecture design of the short-range connectivity architecture subsystem on the mobile station/terminal side. This architecture provides a generic management mechanism to create and manage the transport layer connections. Therefore, different manufacturers' transports can be inserted or plugged into the system without changing higher layer software.

An alternate embodiment of this invention provides for a common platform for application programming interfaces (API) for facilitating the operation of higher layer applications. This embodiment addresses the needs of application designers. An individual designer or company can develop their applications for both Bluetooth and USB without being required to have knowledge of the lower layer devices. The present invention enables extremely flexible application development. It provides a simple mechanism to extend applications to other transports without changing the higher layer application design. That is, modular design components enable Bluetooth and USB application development to be undertaken without requiring knowledge of the details of the individual transport protocols.

In one aspect the invention provides a method for managing transport connections that includes a generic architecture management framework to create transport layer connections which adopt profiles from one transport protocol to another transport protocol while reusing the profile components from one transport protocol for other transport protocols via a central short range connectivity management mechanism.

In another aspect, this invention provides a software subsystem for directing a computer to execute a method that creates transport layer connections for processing transport layer initialization, connection, and registration functionality for adopting profiles from one transport protocol to another transport protocol while reusing the profile components from one transport protocol for other transport protocols, utilizing a central short range connectivity management mechanism.

In another aspect, this invention provides a mobile terminal that includes a wireless transceiver, a data processor, and a memory for use in communicating with wired and wireless protocols utilizing a common transport software subsystem that is shared with other transport protocols.

The use of this invention results in a completely transparent mechanism for application development, regardless of transport, benefiting both developers and users. The user can expect the same behavior on any application regardless of transports. This invention therefore enriches the capability for USB on mobile terminals. A same or similar user interface is adopted to access different transports.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein:

FIG. 3 shows a block diagram of the architecture framework overview according to the present invention;

DETAILED DESCRIPTION OF THE PREFERRED EMBODIMENTS

Symbian OS is an operating system that is specifically designed for portable, battery-powered mobile phones. Some of the key features that make Symbian OS ideal for developing communications software include a flexible client-server based architecture and programming systems to support compact but powerful software on wireless information devices.

Within the Symbian OS platform, according to the present invention, a Short Range Connectivity Server (SRCS) is provided to manage transport connections. Additionally, a Service Controller framework is provided for Object Exchange Protocol (OBEX) related services.

It should be noted at the outset, however, that while the presently preferred embodiment of this invention employs the Symbian OS platform, the teachings of this invention are not limited to only this one particular operating system. Those skilled in the art should recognize that other operating systems, in particular, operating systems that are designed for or adapted for use in wireless terminal devices, can also benefit from the teachings of this invention.

The SRCS is a standalone server that runs multiple service controllers using OBEX over Bluetooth and USB. The SRCS is in charge of the higher layer services controllers.

Figure 1:
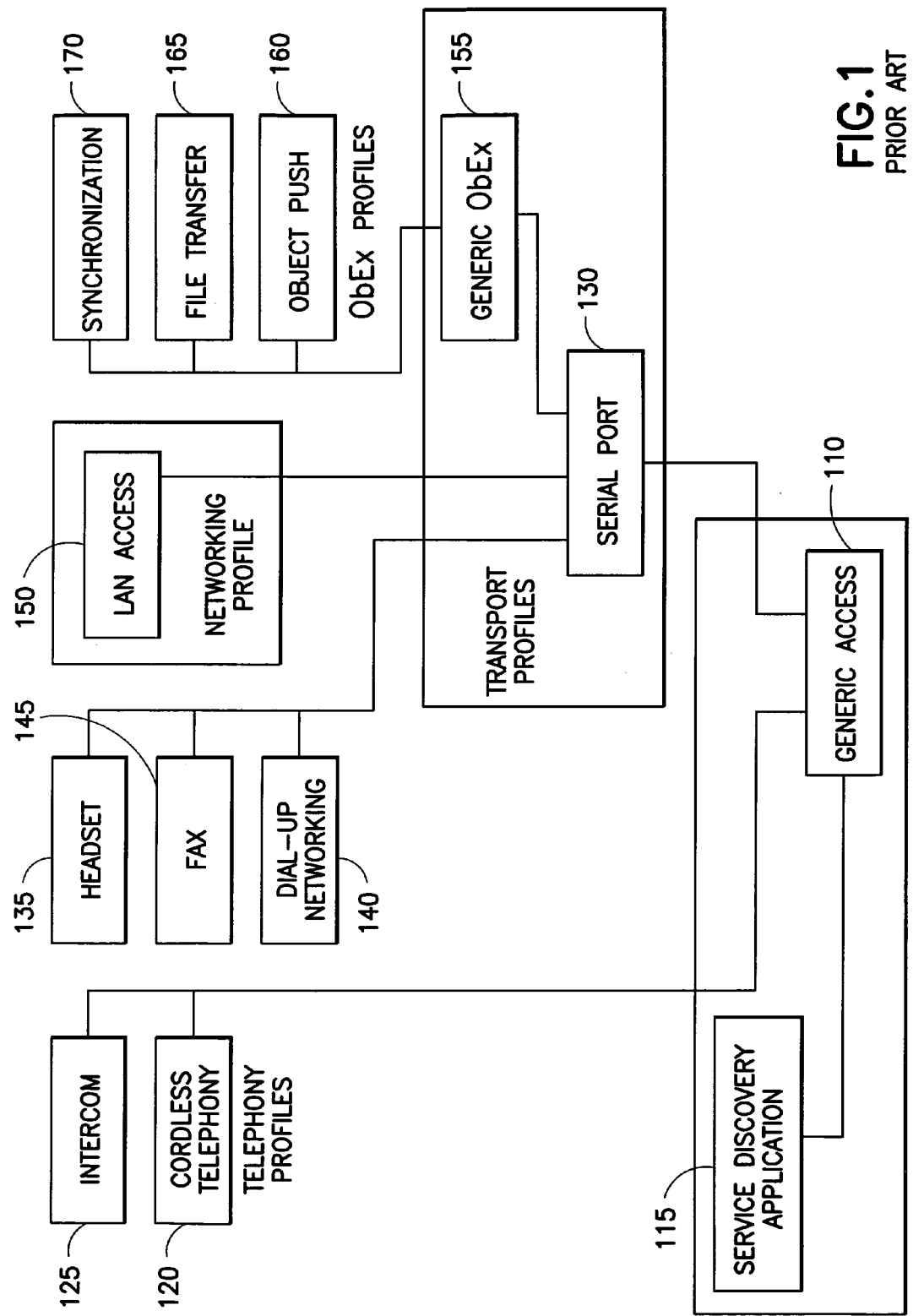
FIG. 1 is simplified diagram of a Bluetooth profile stack.
Figure 2:
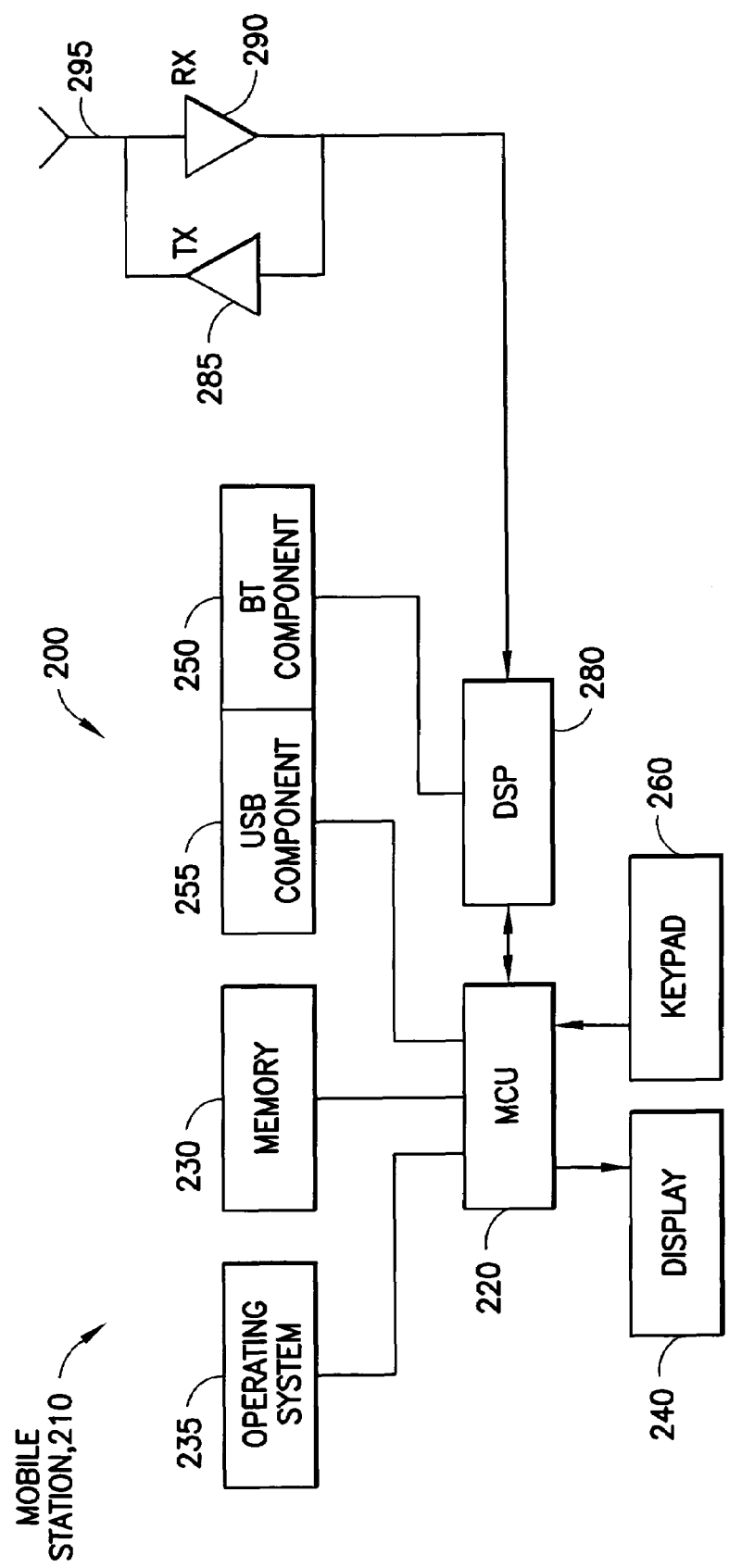
FIG. 2 is a simplified block diagram of an embodiment of a mobile station that is suitable for practicing this invention.

By way of introduction, and referring to FIG. 2, there is shown as a simplified block diagram an embodiment of a mobile station (MS) 210, also referred to herein as a mobile terminal, such as a cellular telephone, a PDA or other handheld platform having wireless communication capabilities. The mobile station 210 typically includes a control unit or control logic, such as a microcontrol unit (MCU) 220 having an output coupled to an input of a display 240 and an input coupled to an output of a keyboard or keypad 260. The mobile station 210 also includes at least one wired connectivity component and at least one wireless connectivity component. In a presently preferred, but non-limiting embodiment, the wireless connectivity component is embodied in a BT component 250 and the wired connectivity component is embodied in a USB component 255. In other embodiments of this invention, other wired connectivity components (e.g. RS232) and other wireless connectivity components (e.g. IrDA) can be used.

The MCU 220 is assumed to include or be coupled to some type of a memory 230, a non-volatile memory for storing a computer operating system 235 and other information, as well as a volatile memory for temporarily storing required data, scratchpad memory, received packet data, packet data to be transmitted, and the like. The computer operating system 235 is assumed, for the purposes of this invention, to enable the MCU 220 to execute the software routines, subsystems, layers and protocols required to implement the methods in accordance with this invention, as well as to provide a suitable user interface (UI), via display 240 and keypad 260, with a user. Although not shown, a microphone and speaker may be provided for enabling the user to conduct voice calls in a conventional manner.

The mobile station 210 also contains a wireless section that includes a digital signal processor (DSP) 280, or equivalent high speed processor or logic, as well as a wireless transceiver that includes a transmitter 285 and a receiver 290, both of which are coupled to an antenna 295 for communication with a wireless network. Data, such as digitized voice and packet data, is transmitted and received through the antenna 295.

FIG. 3 shows the architecture framework for OBEX over BT and USB, as well as the Short Range Connectivity Subsystem 310 according to the present invention. A significant advantage of this design is that the Service Controller 320 only needs to interface with generic Symbian OBEX application programming interfaces (API), making the transport layer completely transparent to the Service Controller 320. The Symbian OBEX over transports (BT and USB) provides a generic API for the SRCS 330 to establish transport bindings, and for the loaded Service Controllers 320 to implement their services.

The present invention is not limited to the BT and USB transport mechanisms, as the Service Controller 320 does not require modification to adopt other implementations of transport connections.

Service registration and discovery are the responsibility of the SRCS 330. Service controllers' Universal Unique Identifier (UUID), security settings, USB OBEX interface string descriptors and OBEX target IDs are stored in the resources files that are associated with the service controllers. The SRCS 330 loads the services controllers' various settings from the resource files and sets OBEX target ID if present. The SRCS 330 receives BT Service Management requests and performs the BT SDP registration and BT security settings through Nokia BT Engine, which is a wrapper over Symbian BT SDP and security API. The SRCS 330 receives USB Service management requests and performs USB OBEX interface descriptor registration through Symbian OBEX API. Over USB, a service controller is identified from the PC side by a string descriptor associated with its OBEX interface descriptor. The string descriptor is normally the name of the service and is stored in the service controller's resource file.

Figure 4:
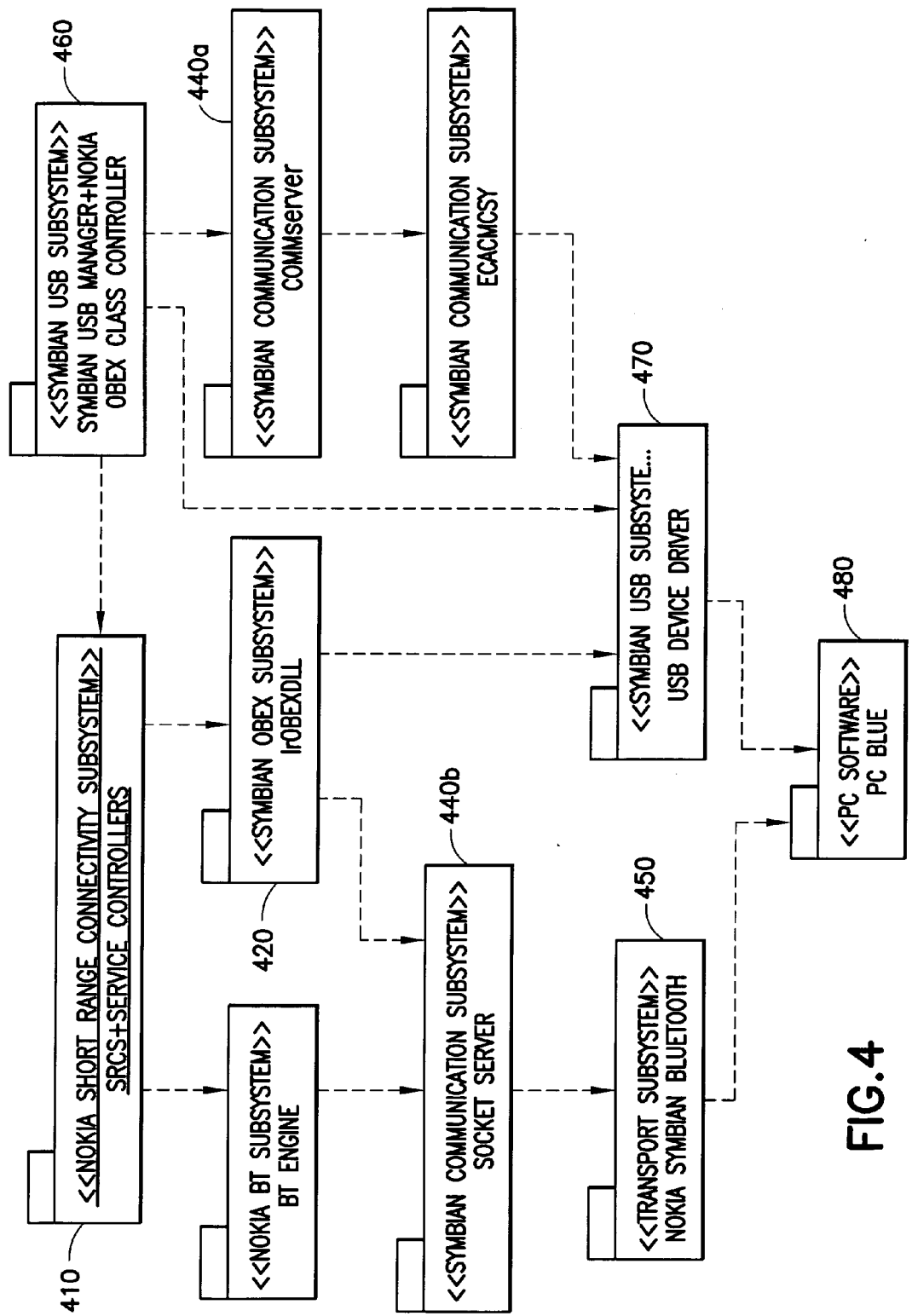
FIG. 4 shows a block diagram of the Short Range Connectivity System Context of the present invention.

The relations between SRCS 330 and other components are presented in FIG. 4. FIG. 4 shows a Unified Modeling Language™ (UML) class/package diagram of the Short Range Connectivity subject area. In the diagram, all packages are stereotyped. The stereotype "subsystem" means that this package contains a coherent set of components that provide a set of services through APIs. Subsystems may also expose their public components. For example, the "Symbian OBEX" subsystem 420 provides OBEX exchange through the "OBEX API" interface that is shown on the package. The diagram shows only those provided APIs and public components that are needed in the context of the Short Range Connectivity subject area.

The PC-side "PC suite" 480 is included in this diagram. This is important from the End-to-End (E2E) viewpoint as the chain of dependencies from "Short Range Connectivity" to "PC suite" implies that there may be a dependency between each of the subsystems in the chain and the PC-side services.

The Short Range Connectivity subsystem 410 is a short range connectivity application, application engine and a generic platform. It provides the SRCS 330 that manages different transport connections. The SRCS 330 also manages numerous service controllers (including capability service controller for USB) that provide services for the PC suite 480.

The Symbian OBEX subsystem 420 includes an OBEX component, OBEX API and OBEX transport binding. It provides an OBEX API for higher layer service controllers' connections and an OBEX connector for application service transport binding.

The communications subsystem includes socket 440(*b*) and COMM 440(*a*) servers that BT API are embedded within. This subsystem provides BT and USB APIs.

The Symbian Bluetooth subsystem 450 includes the SDP server and other BT stacks. It provides BT API through the socket server 440(*b*).

The Symbian USB subsystem 460 includes the Symbian USB Manager. The Symbian USB manager is the central point of controlling all USB services and USB enumeration. The USB subsystem 470 includes the USB driver and hardware. It provides the API for accessing the USB hardware.

The PC software subsystem 480 uses the Short Range Connectivity system. It includes Service Layer, Services Components and other connectivity components. It also includes a user interface (UI) to enable the user to utilize the services that are provided by the mobile terminal. The PC software subsystem further includes the services components that correspond to each services controller on the mobile terminal side.

SRCS 330 is normally started at system initialization. It can also be started when the client first attempts to connect to it. Once started, SRCS 330 will remain resident in memory.

The SRCS application programming interface (API) defines interfaces to manage services on supported transports, e.g. Bluetooth and USB. SRCS 330 uses ECom plug-ins for both transport implementations and service controller implementations. ECom is a generic plug-in framework that enables improved code reuse. The ECom framework manages the complex operations of finding, loading and unloading plug-in dynamic link libraries (DLLs). Upon receiving the service start request for a particular transport, SRCS 330 attempts to load the transport implementation and loads all service controller implementations for that transport. For BT, this involves creating BT connections, registration of SDP and security settings and initialization for all the service controllers for BT. For USB, this involves the registration of proper interface string descriptors and initialization for all the service controllers for USB. Upon receiving a service stop request, SRCS 330 unloads all the plug-ins and un-registers all the settings it previously setup.

Figure 5:
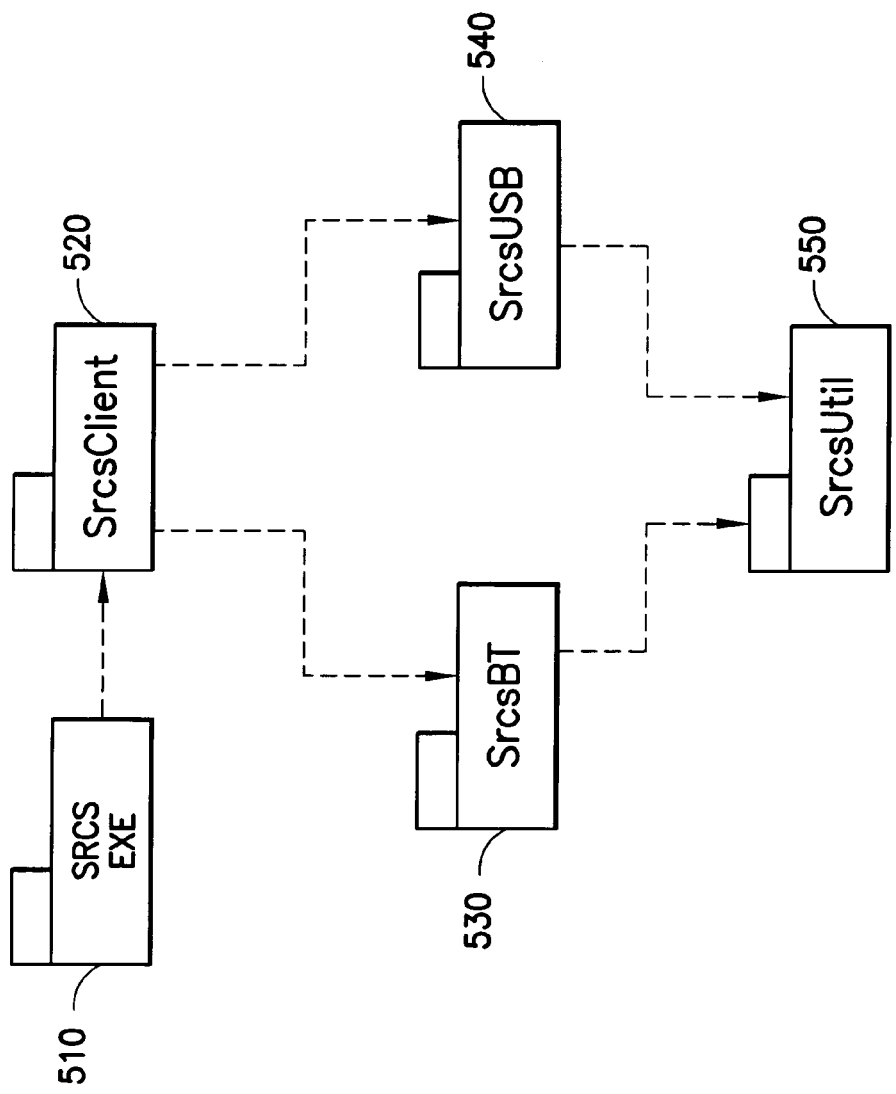
FIG. 5 is a block diagram showing the Short Range Connectivity Server components of the present invention.

FIG. 5 shows SRCS 330 components. The SRCS components include an executable file (SRCS.EXE) 510 that loads the SrcsClient.DLL 520 and starts the server. A SRCS BT.DLL 530 transport ECom plug-in and a SRCSUSB.DLL 540 plug in are also included as well as a common library 550 (SrcsUtil.DLL) utilized by all SRCS transport plug-ins.

Figure 6:
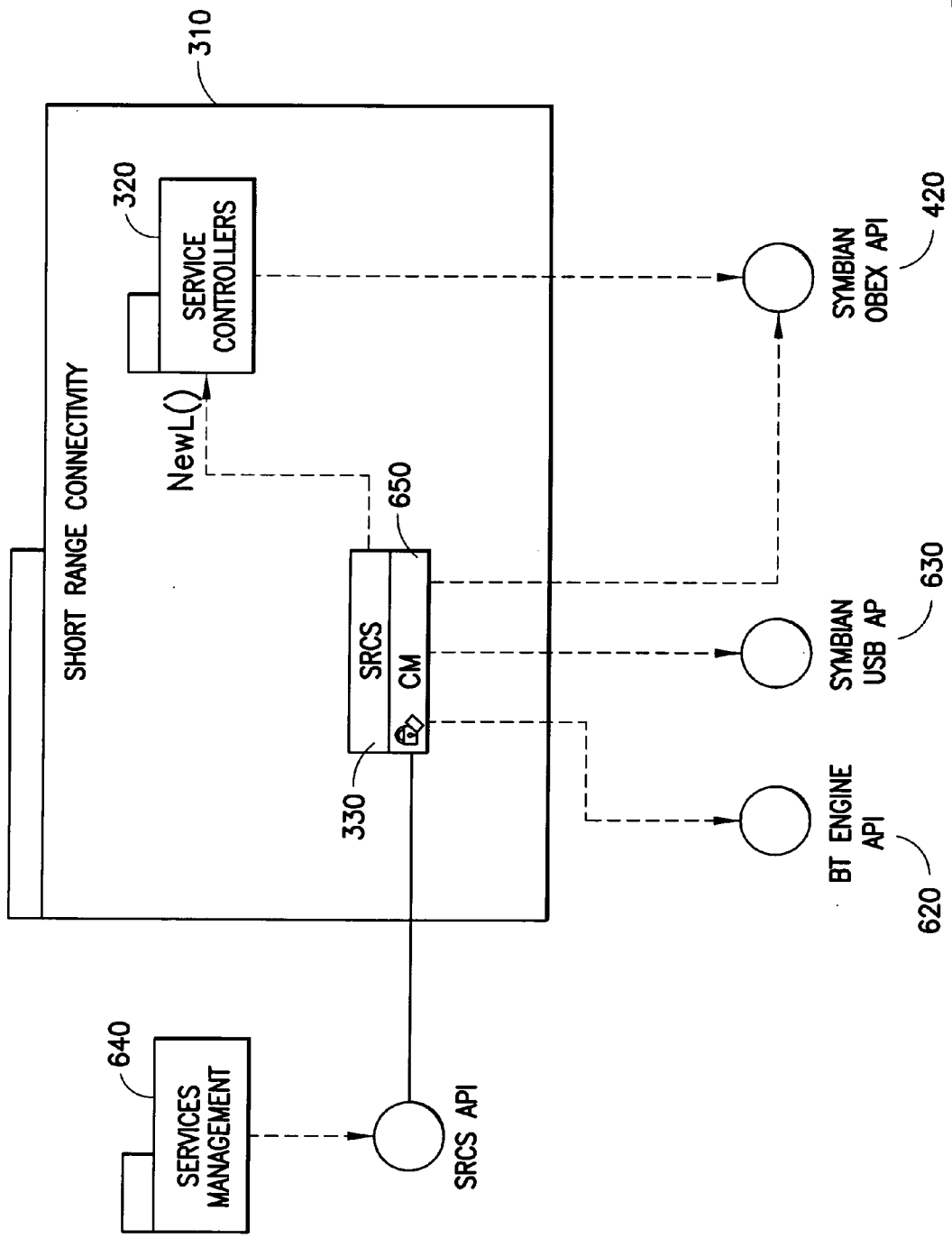
FIG. 6 is a block diagram of showing the components of the Short Range Connectivity Subsystem of the present invention.

FIG. 6 shows the components of the Short Range Connectivity subsystem 310. It shows the individual components that make up the system. It also shows the interfaces from other subsystems that the components depend directly on. The classes may have stereotypes that define the category of the components. Interfaces and APIs are represented using the interface stereotype of UML (shown as a circle).

FIG. 6 shows the SRCS 330 and Service Controllers 320 implementation that make up the Short Range Connectivity package 310. SRCS 330 provides its interface for service management clients. The Services Controllers 320 can be treated as DLLs that are loaded by the SRCS 330.

FIG. 6 also shows the APIs used by the components of the Short Range Connectivity Subsystem 310. Symbian OBEX API 420 is in the Symbian OBEX subsystem, while BT Engine API 620 and USB API 630 are in the Bluetooth and USB subsystems respectively.

The SRCS 330 provides a software platform for Service Controllers 320 to process transport layer initialization, connection, and registration functionality. The SRCS 330 is responsible for listening for service management 640 requests and performing the corresponding processes. It is also responsible for transport channel reservation, services registration (including BT SDP server registration and USB string descriptor registration). The SRCS 330 loads the IrOBEX.DLL (CObexServer class) and sets up the OBEX connector with reserved transport channel. The SRCS 330 instantiates and contains the CObexServer class for each service controller 320. It loads the Service Controller 320 and binds it to the corresponding OBEX instance. It uses Symbian OBEX API 420 and the BT Engine API 620.

The Service Controllers 320 can be treated as the service providers for PC application services. The OBEX common interface is designed as a DLL that is loaded by SRCS 330. Common OBEX call back functions are implemented. The SRCS's management sets up the OBEX data link to Symbian OBEX API 420 through call back functions using the Symbian OBEX API 420. API implementation is provided in a shared DLL that is executed in SRCS's context. API class instance is created in the heap area of the users' mobile terminal and cannot be shared between different users (each user creates its own instance of the API class).

SRCS 330 is a generic platform that is not dependent on transports. SRCS 330 starts when the system starts up and it listens for service management 640 requests or USB up indications. It uses the Connectivity Manager (CM) 650 to manage all transport connections, e.g., BT and USB connections. Upon receiving BT service management request or USB up indication, SRCS 330 uses CM 650 to instantiate a transport connection through transport plug-in SrcsBT.DLL or SrcsUSB.DLL. CM 650 passes in the service controller 320 which is to be instantiated to the Transport Plug-in. The Transport Plug-in then loads the Service Controller 320, reserves transport channel and initializes various settings for that transport connection. Then, the Transport Plug-in binds the OBEX connector to the reserved transport channel and links up the call back function between the OBEX class and the service controller 320.

Service Controllers 320, for example File Transfer Controller (FTC) is a file transfer and manipulation component. It is loaded by SRCS 330 and interfaces with both the Symbian File system and the OBEX interface. The framework of the FTC can be treated as a typical example for all those service controllers that use OBEX.

Figure 7:
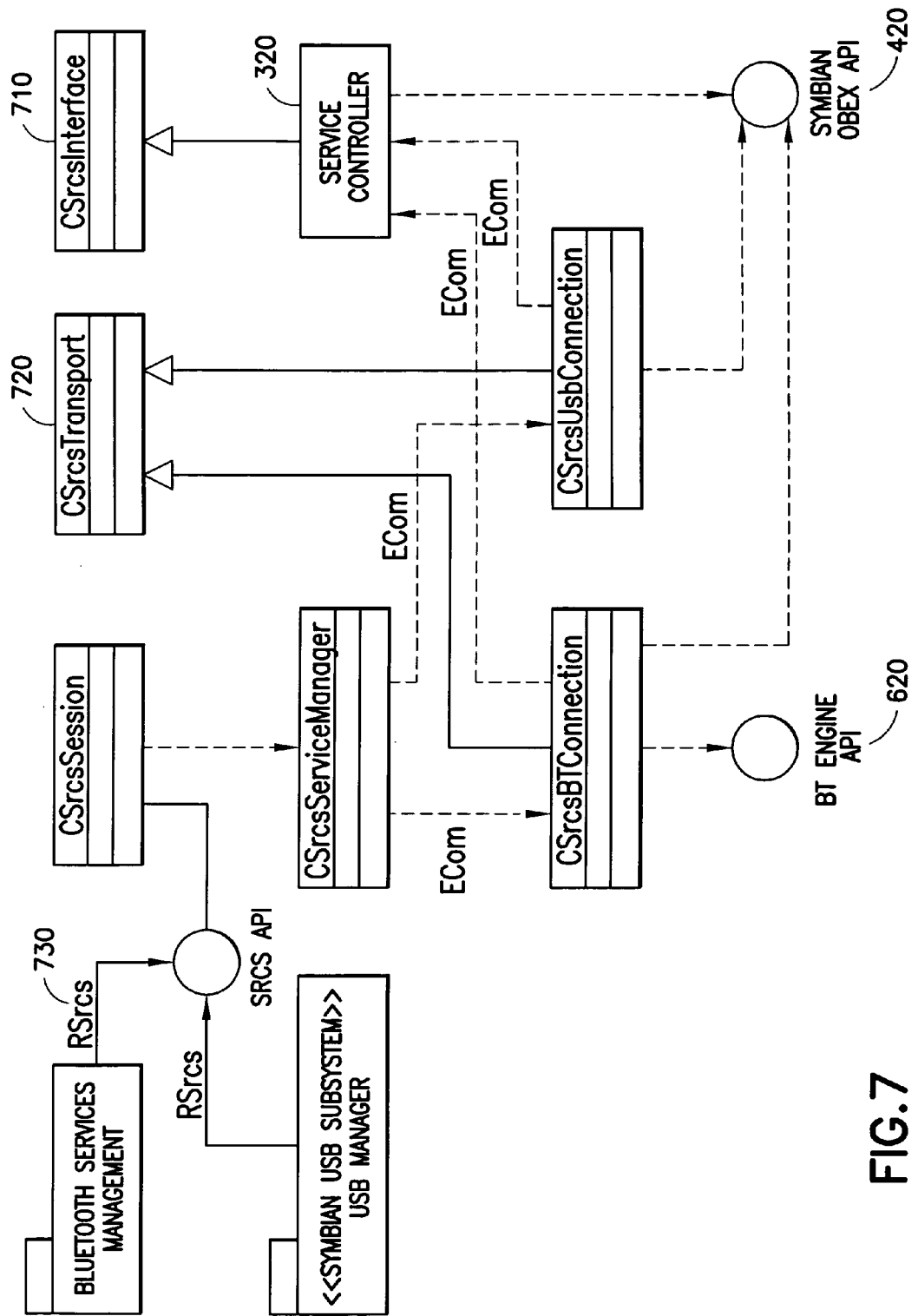
FIG. 7 is a block diagram showing the Short Range Connectivity Server, Transport and Service Controller application programming interfaces (API), according to the present invention.

Referring to FIG. 7, the SRCS 330 provides a transport independent platform for Service Controllers 320. The Service Controllers 320 are ECom plug-in's to SRCS 330 and are based on CSrcsInterface 710. They only use OBEX API 420. They also enable controller configuration at ROM build time.

SRCS also uses ECom for transport plug-ins. This enables support for different transport configuration at ROM build time. All transport plug-ins are based on CSrcsTransport 720 and may use utility functions from SrcsUtil.DLL 550. SRCS 330 can be configured to support different transports by ROM configuration, e.g. including/excluding transport plug-ins.

Service management requests for the transport up/down indications maybe in the form of client/server messages. In this case, SRCS API (RSrcs) 730 supports these requests.

Figure 8:
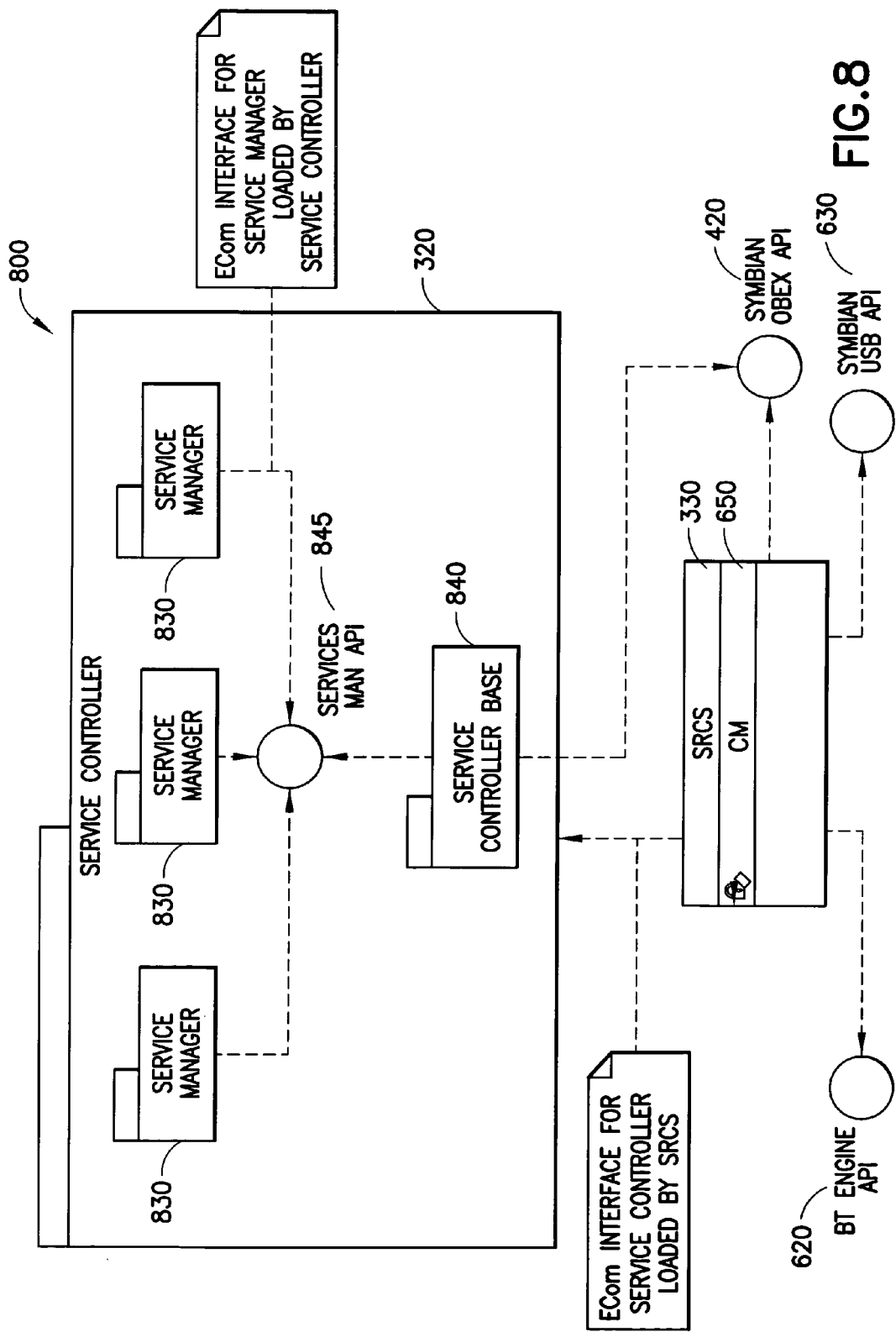
FIG. 8 is a block diagram illustrating the Service Controller Framework of the present invention.

Referring to FIG. 8, Service Controllers 320 are instances inside the SRCS server 330. They are activated and controlled by the SRCS server 330. During the initialization process, the SRCS server 330 creates an OBEX instance and then reserves a free transport channel such as RFCOMM, and registers the Service Controllers 320 specified UUID to SDP or similar database. Following this, the SRCS 330 will activate the Service Controller 320 and pass the Service Controller 320 pointer to the callback function of the OBEX instance. When the Service Controller 320 is starting, it will load its own Service Managers 830 which will provide the actual services. After that, the Service Controller 320 is in listening mode. It can receive service request via OBEX and transports, handle the requests and send responses via OBEX.

Service Managers (SM) 830 are the components that provide specific services. They are designed to be able to plug into the Service Controller Base 840 in order to construct different Service Controllers 320. Current defined Service Managers include PCD, Capability Service Manager (CSM), Symbian File Service Manager (FSM) and Inbox Manager (InboxMan).

The Service Controller Base 840 includes the Service Controller base class and the Service Manager interface 845. The Service Manager Interface 845 provides a generic Ecom plug-in strategy for individual Service Mangers 830 to register and share the same Service Controller Base/OBEX Server/UUID. It is the base class for Service Managers 830. The Service Controller Framework 800 can be reorganized and reunited to specific Service Controllers 320 with different UUID's and Service Managers 830. The framework makes the design of Service Controllers 320 quite flexible. Either the Service Controllers 320 or the Service Managers 830 in the Service Controller 320 can be easily loaded and unloaded by the SRCS 330 or Service Controllers 320 respectively.

Figure 9:
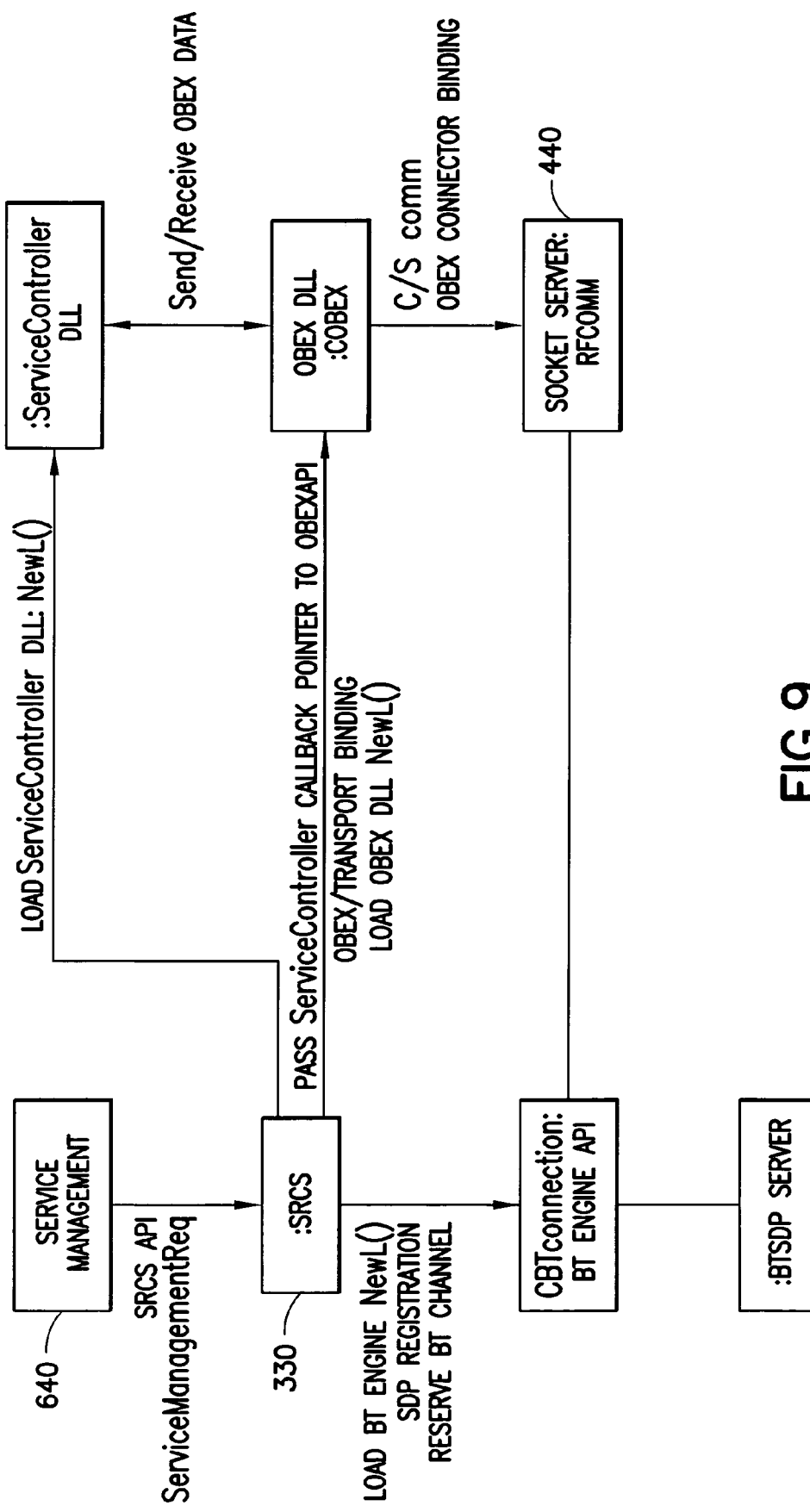
FIG. 9 is a block diagram showing the Bluetooth connection set up and Object Exchange Protocol (OBEX) initialization according to the present invention.
Figure 10:
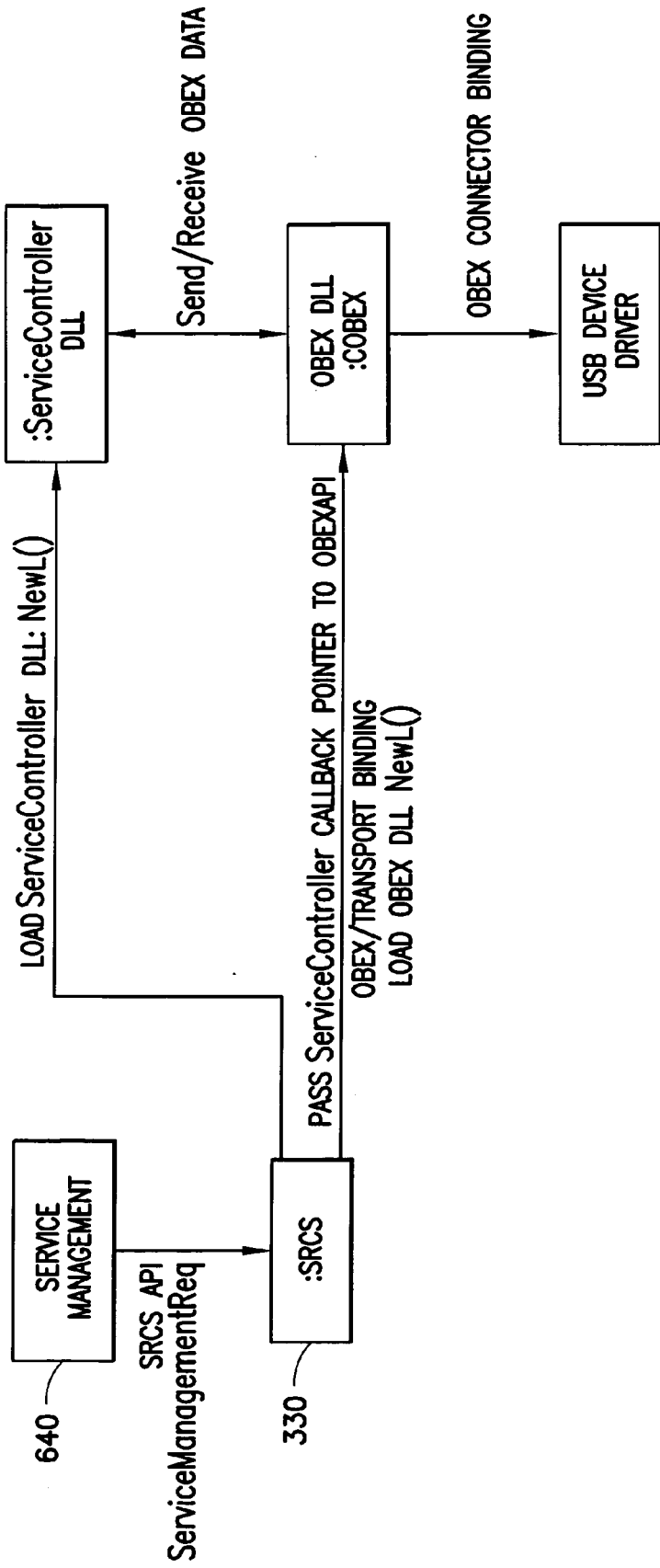
FIG. 10 is a block diagram showing the USB connection set up and OBEX initialization according to the present invention.

FIG. 9 shows the interaction of the system components in the basic use case of transport BT connection set up and OBEX initialization while FIG. 10 displays this process for USB. A significant advantage of this design is the independence of Service Controllers 320 from the transport layer. In FIGS. 9 and 10, objects are used to represent instances of the logical components.

Figure 11:
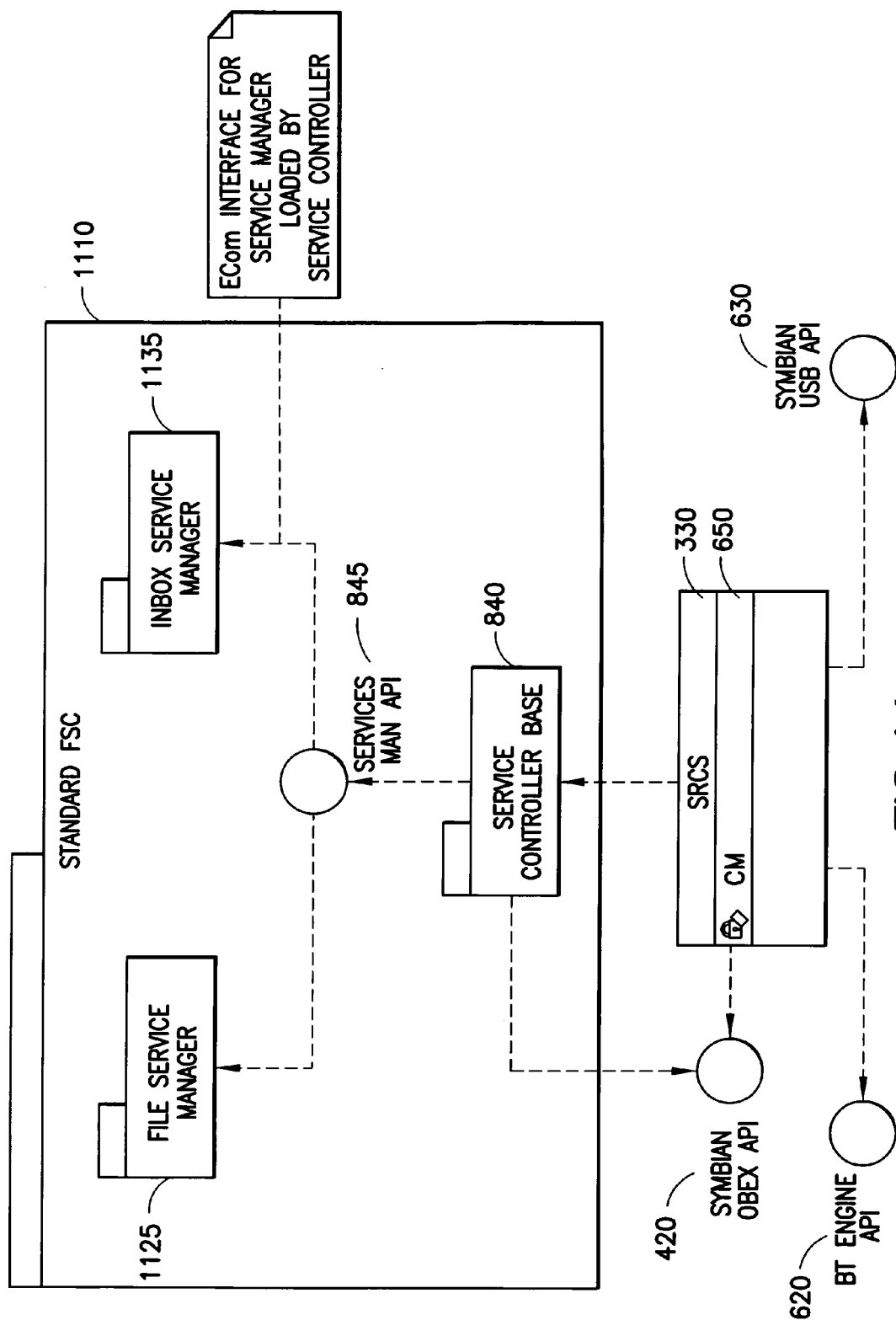
FIG. 11 is a block diagram showing the standard File Service Controller, according to the present invention.

FIG. 11 shows the components for the implementation of the standard File Service Controller (FSC) 1110. These components include the Service Controller Base 840, the Service Manager Interface (SMInterface) 845, which is ECom capable and the two generic code bases from the Service Controller Framework, the File Service Manger 1125 (FSM) that operates the file transfer and file manipulations to the Symbian File system and the Inbox Service Manager 1135 (InboxMan) that operates the file transfer and file manipulations for the default Inbox system. SRCS 330 registers the standard BT File Transfer Profile UUID for this standard FSC.

Figure 12:
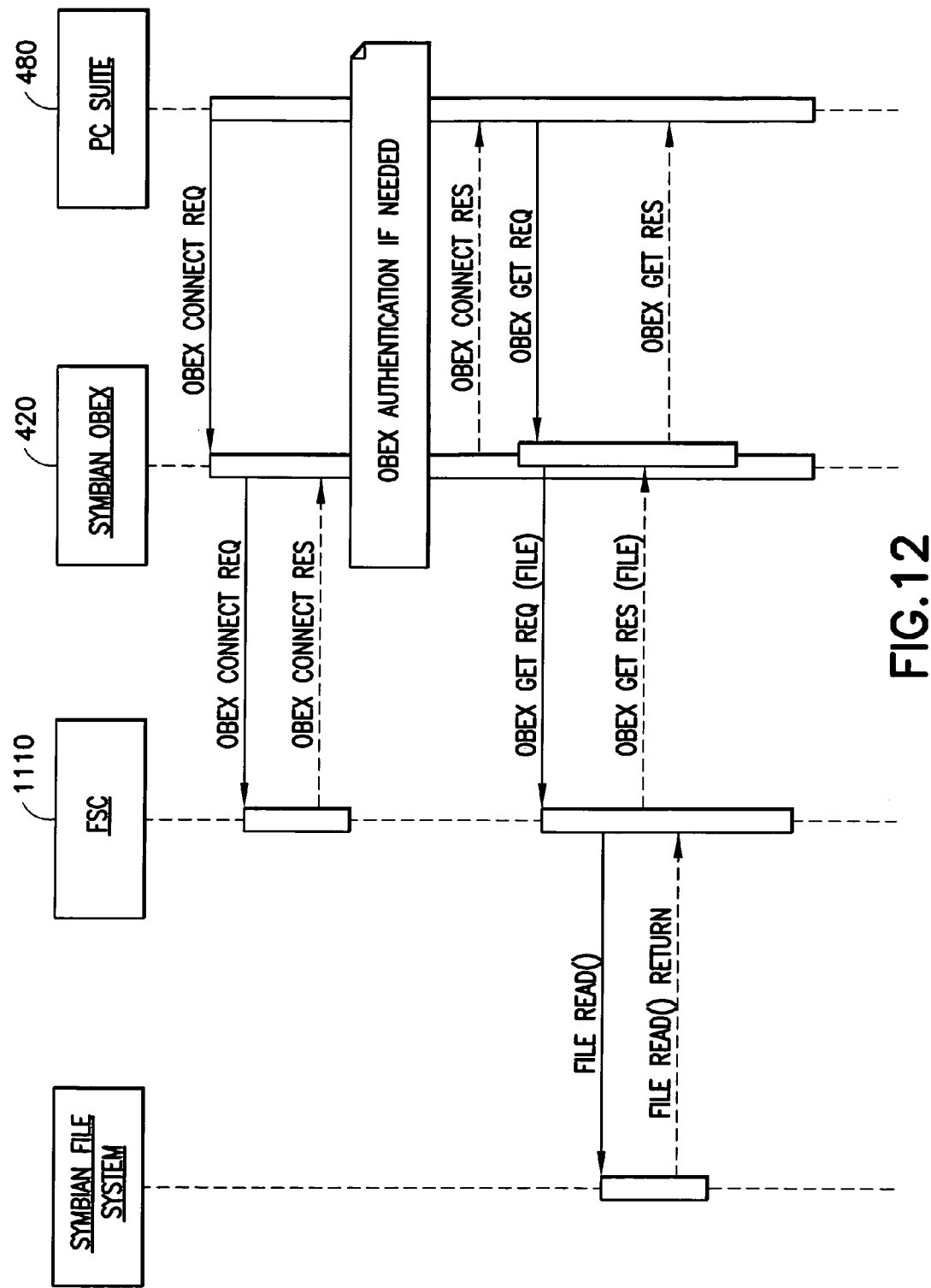
FIG. 12 is a block diagram showing the file transfer process for the File Service Controller (FSC) according to the present invention.

FIG. 12 shows a simplified message sequence chart (MSC) for the FSC that illustrates the interaction between the PC 480 suite and Short Range Connectivity subsystem 310.

Figure 13:
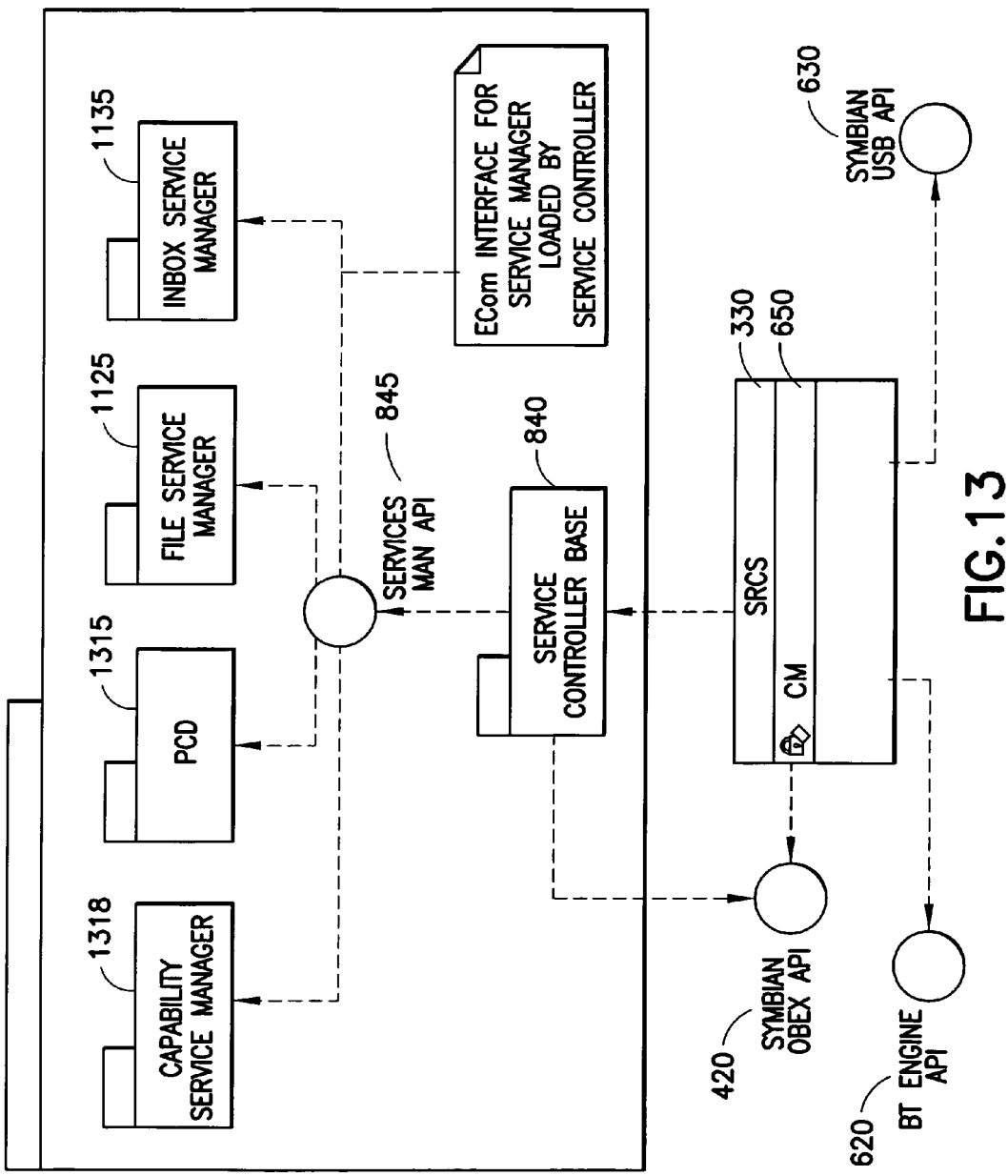
FIG. 13 is a block diagram showing an alternate File Service Controller, according to the present invention.

An alternate embodiment of the FSC is shown in FIG. 13. It is the standard FSC as in FIG. 11, with two additional plug-in Service Managers, a PCD 1315 and a Capability Service Manager (CSM) 1318.

Figure 14:
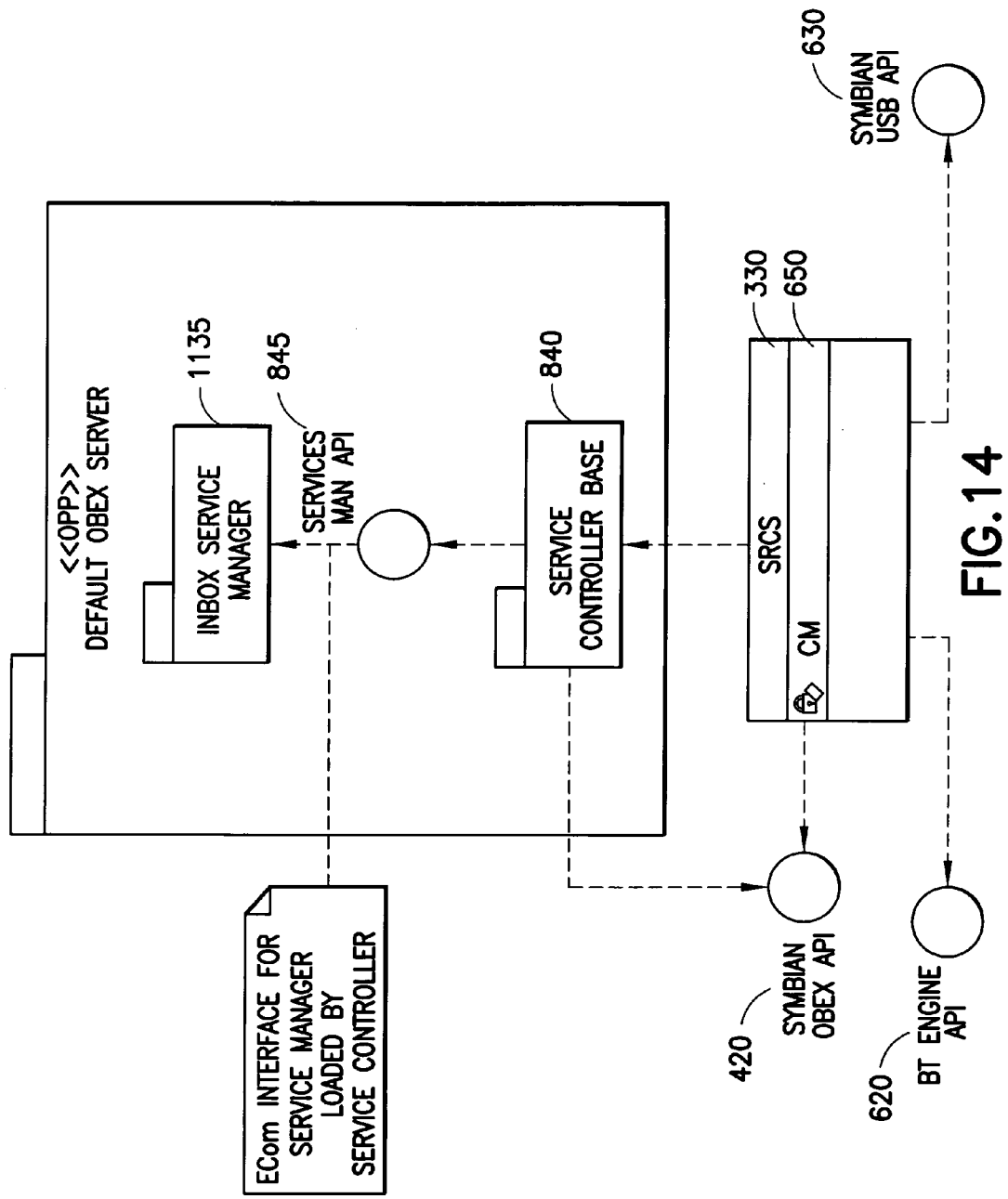
FIG. 14 is a block diagram of the Object Push Profile (default OBEX service controller, according to the present invention.

FIG. 14 shows the structure of the Object Push Profile (OPP) default OBEX service. The OPP default OBEX service has only one Service Manager (InboxMan) 1135 in this diagram, but it is not limited as other Service Managers may be added including the CSM 1318. The BT OPP UUID is adopted to support this Service Controller within SRCS 330.

Figure 15:
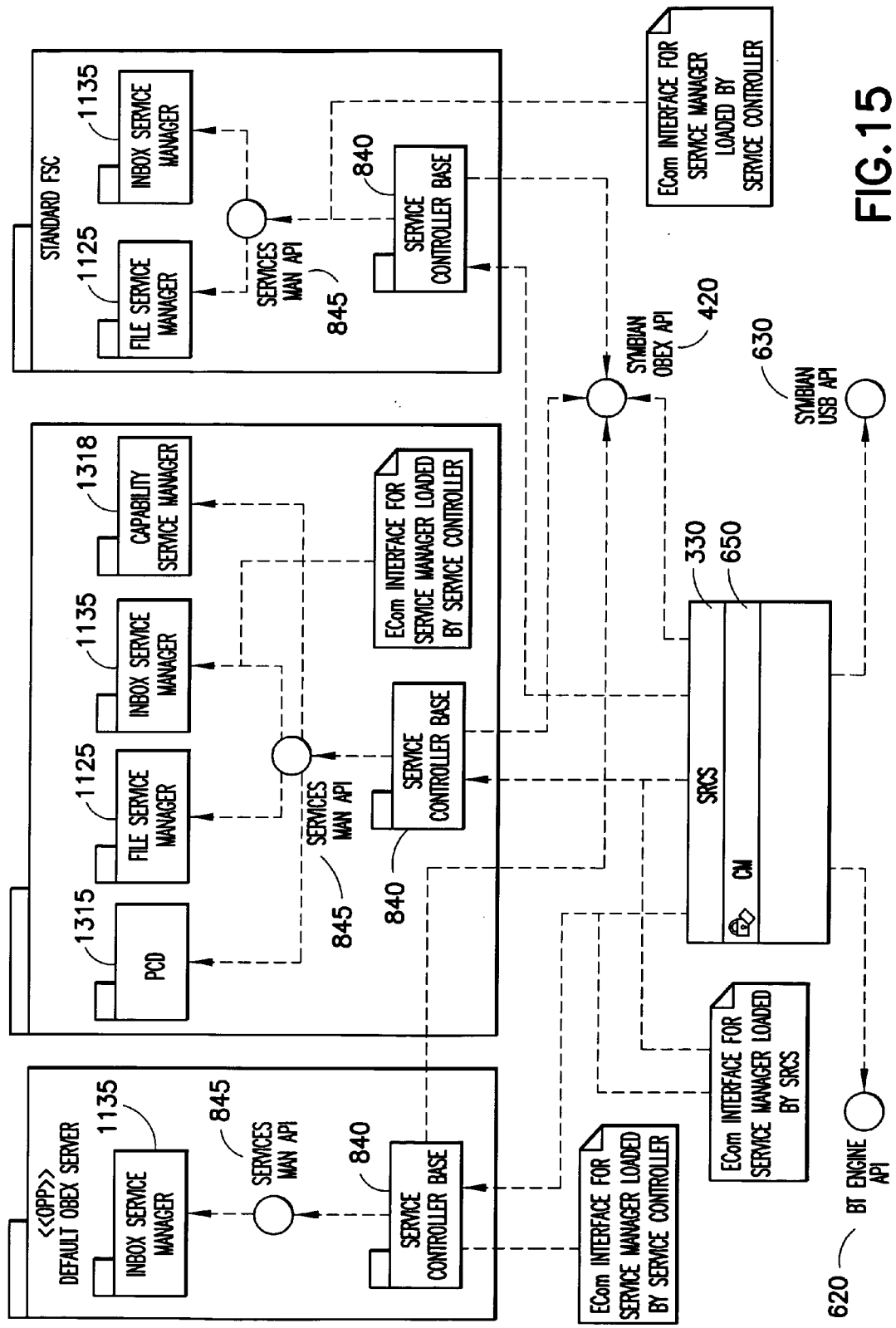
FIG. 15 is a block diagram of Service Controllers and the Short Range Connectivity Server, according to the present invention.

These Service Controllers can also be combined as illustrated in FIG. 15. These SCs are completely independent to each other, though they share a common code base. It is the role of the SRCS to determine which SC is loaded and how to load it.

While this invention has been described above in the context of presently preferred embodiments, those having skill in the art should appreciate that the foregoing description is not to be construed in a limiting sense upon the implementation and practice of this invention, especially in view of the fact that those having skill in the art may derive various modifications to this invention, when guided by the foregoing description. While the preferred embodiment of this invention has been described with respect to the Symbian operating system, and as was noted above, those skilled in the art will realize that it may be applied to other operating systems suitably adapted for use in mobile devices. Furthermore, while generally described in the context of the use of at least two transport mechanisms, where one is a wired and the other a wireless transport mechanism, it should be appreciated that the two or more transport mechanisms of interest may each be wired transport mechanisms or wireless transport mechanisms.

Further, while the method described herein is provided with a certain degree of specificity, the present invention could be implemented with either greater or lesser specificity, depending on the needs of the user. Further, some of the features of the present invention could be used to advantage without the corresponding use of other features. All such and similar modifications to the invention as disclosed above are considered to fall within the scope of this invention.

What is claimed is:

1. A method comprising:
   providing a generic architecture management framework;
   creating at least one transport layer connection, comprising receiving a service management request and performing protocol registration through at least one of a socket server and a communication server;
   adopting with the at least one created transport layer connection at least one profile from one transport protocol to another different transport protocol; and reusing at least one profile component from the one transport protocol for the another different transport protocol via a short range connectivity management mechanism.

2. A method as in claim 1, where one protocol is a Bluetooth protocol.

3. A method as in claim 1, where one protocol is a Universal Serial Bus protocol.

4. A method as in claim 1, where one protocol is an Infrared Data Association protocol.

5. A method as in claim 1, where one protocol is an RS232 protocol.

6. A method as in claim 1, where one protocol is a wireless protocol.

7. A method as in claim 1, where one protocol is a wired protocol.

8. A method as in claim 1, where the generic architecture framework comprises an object exchange related service.

9. A method as in claim 1, wherein the short range connectivity management mechanism comprises a short range connectivity application, application engine and generic platform.

10. A method as in claim 1, further comprising performing service registration and discovery.

11. A method as in claim 1, further comprising loading a connectivity component to perform channel reservation and service registration for a Bluetooth protocol.

12. A method as in claim 1, further comprising loading a connectivity component to perform channel reservation and service registration for a Universal Serial Bus protocol.

13. A method as in claim 1, further comprising establishing a link between an object exchange data link library and a service controller.

14. A method as in claim 1, further comprising providing an application programming interface to manage at least one service for a Bluetooth protocol.

15. A method as in claim 1, further comprising providing an application programming interface to manage at least one service for a Universal Serial Bus protocol.

16. A computer readable medium storing program instructions for directing a computer to perform operations that comprise:
  creating at least one transport layer connection, comprising receiving a service management request and performing protocol registration through at least one of a socket server and a communication server;
  processing transport layer initialization, connection, and registration functionality;
  adopting with the at least one created transport layer connection at least one profile from one transport protocol to another different transport protocol; and reusing at least one profile component from the one transport protocol the another different transport protocol via a short range connectivity management mechanism.

17. A mobile terminal, comprising a wireless transceiver, a data processor, and a memory for use in communicating with at least one of a wired and a wireless protocol utilizing a transport software subsystem that is used in common with a plurality of transport protocols, where said transport software subsystem comprises an architecture management framework configurable to create at least one transport layer connection, comprising receiving a service management request and performing protocol registration through at least one of a socket server and a communication server, where the created at least one transport layer connection is configured to adopt at least one profile from one transport protocol to another different transport protocol and to reuse at least one profile component from the one transport protocol for the another different transport protocol.

18. A mobile terminal as in claim 17, where the transport software subsystem operates in conjunction with an operating system.

19. A mobile terminal as in claim 18, where the operating system comprises a Symbian operating system.

20. A mobile terminal as in claim 17, where one protocol is a Bluetooth protocol.

21. A mobile terminal as in claim 17, where one protocol is a Universal Serial Bus protocol.

22. A mobile terminal as in claim 17, where the transport software subsystem provides an application programming interface to manage at least one service for a Bluetooth protocol.

23. A mobile terminal as in claim 17, where the transport software subsystem provides an application programming interface to manage at least one service for a Universal Serial Bus protocol.

24. A method comprising providing a generic architecture management framework, creating at least one transport layer connection, comprising receiving a service management request and performing protocol registration through at least one of a socket server and a communication server, adopting with the at least one created transport layer connection at least one profile from one transport protocol to another different transport protocol, and reusing at least one profile component from the one transport protocol for the another different transport protocol, wherein creating a transport layer connection comprises receiving a service management request and performing protocol registration through at least one of a socket server and a communication server.

25. A method as in claim 24, where the one protocol is one of an Infrared Data Association protocol, an RS232 protocol, an OBEX protocol, an USB protocol and a Bluetooth protocol.

26. A method as in claim 24, where the created transport layer connection comprises a wired connection.

27. A method as in claim 24, where the created transport layer connection comprises a wireless connection.

28. A method as in claim 24, further comprising providing a short range connectivity application, application engine and generic platform.

29. A method as in claim 24, further comprising performing service registration and discovery.

30. An apparatus comprising:
  means for creating at least one transport layer connection, comprising means for receiving a service management request and performing protocol registration through at least one of a socket server and a communication server;
  means for adopting with the at least one created transport layer connection at least one profile from one transport protocol to another different transport protocol; and
  means for reusing at least one profile component from the one transport protocol for the another, different transport protocol.

31. An apparatus as in claim 30, where the one protocol is one of an Infrared Data Association protocol, an RS232 protocol, an OBEX protocol, an USB protocol and a Bluetooth protocol.

32. An apparatus as in claim 30, where the created transport layer connection comprises a wired connection.

33. An apparatus as in claim 30, where the created transport layer connection comprises a wireless connection.

* * * * *